US007844899B2

(12) United States Patent
Boucher

(10) Patent No.: US 7,844,899 B2
(45) Date of Patent: Nov. 30, 2010

(54) CITATION PROCESSING SYSTEM WITH MULTIPLE RULE SET ENGINE

(75) Inventor: Michael L. Boucher, Lafayette, CO (US)

(73) Assignee: Dakota Legal Software, Inc., Lafayette, CO (US)

( * ) Notice: Subject to any disclaimer, the term of this patent is extended or adjusted under 35 U.S.C. 154(b) by 763 days.

(21) Appl. No.: 11/657,281

(22) Filed: Jan. 24, 2007

(65) Prior Publication Data

US 2008/0178077 A1 Jul. 24, 2008

(51) Int. Cl.
*G06F 17/00* (2006.01)

(52) U.S. Cl. ........................ 715/266; 715/230; 715/249; 715/256

(58) Field of Classification Search ................. 715/256, 715/266, 230, 249
See application file for complete search history.

(56) References Cited

U.S. PATENT DOCUMENTS

| | | | | |
|---|---|---|---|---|
| 5,097,418 | A * | 3/1992 | Nurse et al. | 715/207 |
| 5,608,625 | A * | 3/1997 | Bailey | 715/229 |
| 5,794,236 | A * | 8/1998 | Mehrle | 707/5 |
| 5,870,770 | A * | 2/1999 | Wolfe | 715/805 |
| 6,529,911 | B1 * | 3/2003 | Mielenhausen | 707/100 |
| 7,028,259 | B1 | 4/2006 | Jacobson | |
| 7,437,668 | B2 | 10/2008 | Slein | |
| 7,529,756 | B1 * | 5/2009 | Haschart et al. | 707/100 |
| 7,694,222 | B2 * | 4/2010 | Steen et al. | 715/255 |
| 2002/0178185 | A1 * | 11/2002 | Kuchinsky et al. | 707/512 |
| 2003/0101181 | A1 * | 5/2003 | Al-Kofahi et al. | 707/7 |
| 2004/0139400 | A1 * | 7/2004 | Allam et al. | 715/526 |
| 2004/0205731 | A1 * | 10/2004 | Junkermann | 717/136 |
| 2004/0226002 | A1 * | 11/2004 | Larcheveque et al. | 717/126 |
| 2005/0188322 | A1 * | 8/2005 | Napoleon | 715/760 |
| 2005/0203924 | A1 * | 9/2005 | Rosenberg | 707/100 |
| 2006/0149720 | A1 * | 7/2006 | Dehlinger | 707/3 |
| 2006/0195430 | A1 * | 8/2006 | Arumainayagam et al. | 707/3 |
| 2006/0218492 | A1 * | 9/2006 | Andrade | 715/523 |
| 2006/0248440 | A1 * | 11/2006 | Rhoads et al. | 715/500 |
| 2006/0287971 | A1 * | 12/2006 | Armstrong | 707/1 |
| 2007/0050403 | A1 * | 3/2007 | Dhairyawan et al. | 707/103 R |
| 2007/0172062 | A1 * | 7/2007 | Waldo et al. | 380/252 |
| 2007/0239704 | A1 * | 10/2007 | Burns et al. | 707/5 |
| 2008/0040663 | A1 | 2/2008 | Johnson et al. | |

OTHER PUBLICATIONS

Lexis Nexis Citation Tools Installation Instructions, 16 pages, copyright 2003.

(Continued)

*Primary Examiner*—Joshua D Campbell
*Assistant Examiner*—Marshon Robinson
(74) *Attorney, Agent, or Firm*—Brinks Hofer Gilson & Lione

(57) ABSTRACT

A citation system parses, error checks, corrects, and transforms citations between citation systems. The system may determine the available citation systems, such as The Bluebook, The Chicago Manual of Style, or other citation systems available for selection. The system also determines a selected citation system from among the multiple citation systems. For example, the system may determine that a writer has selected The Bluebook citation system from among those available to the system. The system also determines an applicable rule set for the selected citation system, and applies to rule set to an input citation to obtain an output citation component.

29 Claims, 15 Drawing Sheets

OTHER PUBLICATIONS

CheckCite, 8.7 Program Documentation, 26 pages, undated.

WestCheck.com User Manual, Table of Contents and pp. 1-20, copyright 2006.

LexisNexis CiteRite 7.1, Knowledge Base pp. Installation, Using the Software, Error Messages, Compatability Chart, 14 pages, undated.

Pleadings, Agreements, and Other Long Documents, Microsoft Word 2003 for Law Firms, Chapter 13, pp. 485-491, Publication: Payne Consulting Group, ISBN: 0-9753368-0-0.

CiteIt! Version 3 User Manual, Sidebar Software, Inc., 82 pgs., copyright 1997-2004.

Eugene P. Stein, *Micosoft Word 2003 for Law Firms*, Chapters 12 and 13, pp. 425-504, 2004.

The prosecution history of U.S. Appl. No. 11/532,378 shown in the attached Patent Application Retrieval file wrapper document list, printed Mar. 12, 2010, including each substantive office action and applicant response.

The prosecution history of U.S. Appl. No. 11/532,378 shown in the attached Patent Application Retrieval file wrapper document list, printed Dec. 22, 2009, including each substantive office action and applicant response.

* cited by examiner

300

| Add Variable | | |
|---|---|---|
| Name | 302 | Federal |
| ValidFunc | 304 | Is_close("Federal") |
| GenFunc | 306 | Generate("Fed.") |
| Wrong | 308 | |
| Fallback | 310 | |
| Save | 312 | |
| LimitFunc | 314 | |
| Italic | 316 | |
| Comment | 318 | |
| OK | | Cancel |

400

| Add Variable | | |
|---|---|---|
| Name | 302 | State |
| ValidFunc | 304 | Is_US_State |
| GenFunc | 306 | Make_us_state_abbr |
| Wrong | 308 | |
| Fallback | 310 | |
| Save | 312 | |
| LimitFunc | 314 | |
| Italic | 316 | |
| Comment | 318 | |
| OK | | Cancel |

600

```
<?xml version='1.0'
encoding='UTF-8'
standalone='yes'?>

<Citation_Graph>
  <Node>
    <Name>Begin</Name>
    <ID>0</ID>
    <Node_Type>BeginGraph</Node_Type>
    <Screen_Coordinates>24,91</Screen_Coordinates>
    <Lines_In>none</Lines_In>
  </Node>

602  <Node>
    <Name>Federal</Name>  604
606 <ID>1</ID>
    <Node_Type>Variable</Node_Type>  608
610 <Screen_Coordinates>276,47</Screen_Coordinates>
612 <Lines_In>0</Lines_In>
    <Valid_Func>is_close("Federal")</Valid_Func>  614
616 <GenFunc>generate("Fed. ")</GenFunc>
  </Node>

  <Node>
    <Name>Rules</Name>
    <ID>2</ID>
    <Node_Type>Variable</Node_Type>
    <Screen_Coordinates>369,27</Screen_Coordinates>
    <Lines_In>1,33</Lines_In>
    <Valid_Func>is_close("Rules")</Valid_Func>
    <GenFunc>generate(" R. ")</GenFunc>
  </Node>

  <Node>
    <Name>of</Name>
    <ID>3</ID>
    <Node_Type>Constant</Node_Type>
    <Screen_Coordinates>450,7</Screen_Coordinates>
    <Lines_In>2</Lines_In>
618 <Value>of</Value>
    <Wrong>1</Wrong>  620
  </Node>
```

704 boolean recognize_procedural_rules(Citation citation) {    702
    citation.push();
    if(!recognize_state(citation) &&
       !recognize_federal(citation)) {
        citation.pop();
706     return false;    708
    }            710
}

Figure 7

CITATION PROCESSING SYSTEM WITH MULTIPLE RULE SET ENGINE

CODE APPENDIX

This patent document is filed with and incorporates by reference the entire contents of all the files submitted on two compacts discs, of which the second disc is a duplicate of the first disc, including the following files:

| Name | Creation Date | Size (Bytes) |
|---|---|---|
| AdministrativeRegulations.h.xml | 18-Jan-2007 | 890 |
| AdministrativeRegulations.xml | 18-Jan-2007 | 20,246 |
| CaseCitation.h.xml | 18-Jan-2007 | 2,131 |
| CaseCitation.xml | 18-Jan-2007 | 101,242 |
| Common.h.xml | 18-Jan-2007 | 3,930 |
| Common.xml | 18-Jan-2007 | 49,508 |
| ProceduralRules.h.xml | 18-Jan-2007 | 174 |
| ProceduralRules.xml | 18-Jan-2007 | 10,279 |
| ShortForms.h.xml | 18-Jan-2007 | 1,471 |
| ShortForms.xml | 18-Jan-2007 | 10,363 |
| Statute.h.xml | 18-Jan-2007 | 6,708 |
| Statute.xml | 18-Jan-2007 | 160,679 |
| USConsitution.h.xml | 18-Jan-2007 | 1,615 |
| USConstitution.xml | 18-Jan-2007 | 35,214 |

COPYRIGHT NOTICE

This patent document contains material subject to copyright protection. The copyright owner has no objection to the reproduction by anyone of the patent document or the patent disclosure, as it appears in the Patent and Trademark Office patent file or records, but otherwise reserves all copyright rights whatsoever. The following notice applies to all software, data, description, and illustrations described below and shown in the drawings: Copyright© 2006-2007, Dakota Legal Software, Inc., All Rights Reserved.

BACKGROUND OF THE INVENTION

1. Technical Field

This disclosure relates to processing systems that handle citations to authorities. In particular, this disclosure relates to a citation processing system that parses, error checks, and corrects citations, and that automatically transforms citations that adhere to one citation system to meet the requirements of another citation system.

2. Related Art

Citations to legal and nonlegal materials are typically found in legal writings of all sorts, including filings with a court or government agency, papers in scholarly journals, law student assignments, articles in legal periodicals and other publications. These citations must conform to specific rules established by the citation system adopted by the authority to which they are submitted. Examples of citation systems include the systems described in The Bluebook: A Uniform System of Citation, ALWD Citation Manual: A Professional System of Citation, local court rules, and citation requirements for specific publications such as legal journals or periodicals.

The rules of the various citations systems may be quite complex. For example, rule 2.1(f) in the 18th edition of the Bluebook describes which commas must and must not be italicized, rule 5.1(a) describes substantially different treatment for quotations that are 49 words long compared with quotations that are 50 words long, and rule 13.7(c) describes how it interacts with rule 4.1(a) to determine the presentation of a footnote that appears within five footnotes of another footnote to the same source but not within a filing to a court.

Even within a single citation system, the rules may be inconsistent from one use to another. For example, the Introduction section in the 18th edition of The Bluebook notes that there are different conventions for writing materials for a court versus using exactly the same materials for a law review article, and in fact the differences are substantial. As another example, the third edition of the ALWD manual notes substantial differences between the formats for court filings in Colorado compared with filings in Michigan. Even within a single citation system in a single jurisdiction, the rules may be inconsistent. There may be different rules of citation as a case goes from a trial court to an appellate court to a court of final decision, or when a case is removed from state court to federal court. The rules in the same citation system also become inconsistent over time. For example, the Preface to the 18th edition of the Bluebook lists two pages of changes from the 17th edition, so writing that conforms to the rules in the 17th edition of the Bluebook might not conform to the 16th or 18th editions.

Therefore, there has long been a need for a citation processing system that parses, error checks, and corrects citations, and that correctly transforms citations between the requirements of widely varying citation systems without burdening the author of a document with the extreme complexity and inconsistencies of the citation systems.

SUMMARY

In one implementation, a citation processing system ("system") transforms citations between citation systems. The system may determine the available rule sets for multiple citation systems (e.g., The Bluebook, Association of Legal Writing Directors (ALWD) Citation Manual, The Chicago Manual of Style, the Maroonbook, or other systems). The system also determines a selected citation system from among the multiple available citation systems. For example, the system may determine that a writer has selected The Bluebook citation system from among those available to the system.

The system also receives an input citation. The input citation may adhere, to any degree, to any citation system. As an example, the input citation may adhere to the ALWD citation system. An applicable rule set for the selected citation system is chosen from available rule sets. The system then applies the applicable rule set to the input citation to determine an output citation component that adheres to the selected citation system.

The system allows the operator to dynamically change citation systems. As a result, the operator has the flexibility to adapt a particular document for suitability in any particular jurisdiction with any particular required citation system. To that end, the system may determine a subsequent selection of a different citation system from among the multiple citation systems, access a different rule set chosen for the different citation system, and automatically apply the different rule set to the output citation component to determine a different citation component adhering to the different citation system.

The system may automatically apply any selected citation system to any number of citations in an electronic document, such as a word processor document, spreadsheet, web page, or other document. In addition, the system may bind the selected citation system to an electronic document file that includes the citation. The electronic document file may then identify the citation system applicable for the electronic document to which the system may enforce citation style moving forward as future editing occurs.

The input citation need not provide all of the citation components needed to form the output citation. Thus, the system may determine that an additional citation component is needed to complete the output citation so that it adheres to the selection citation system. In one implementation, the system pro-actively searches for and retrieves the citation component from a third party source, such as a database of citation components, through a prompt for manual input, or from another source.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

This disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 6 shows an example encoding of graph nodes for a citation rule in an extensible Markup Language (XML) format.

FIG. 7 shows a program that implements part of a rule.

DETAILED DESCRIPTION OF THE PREFERRED EMBODIMENTS

Figure 1:
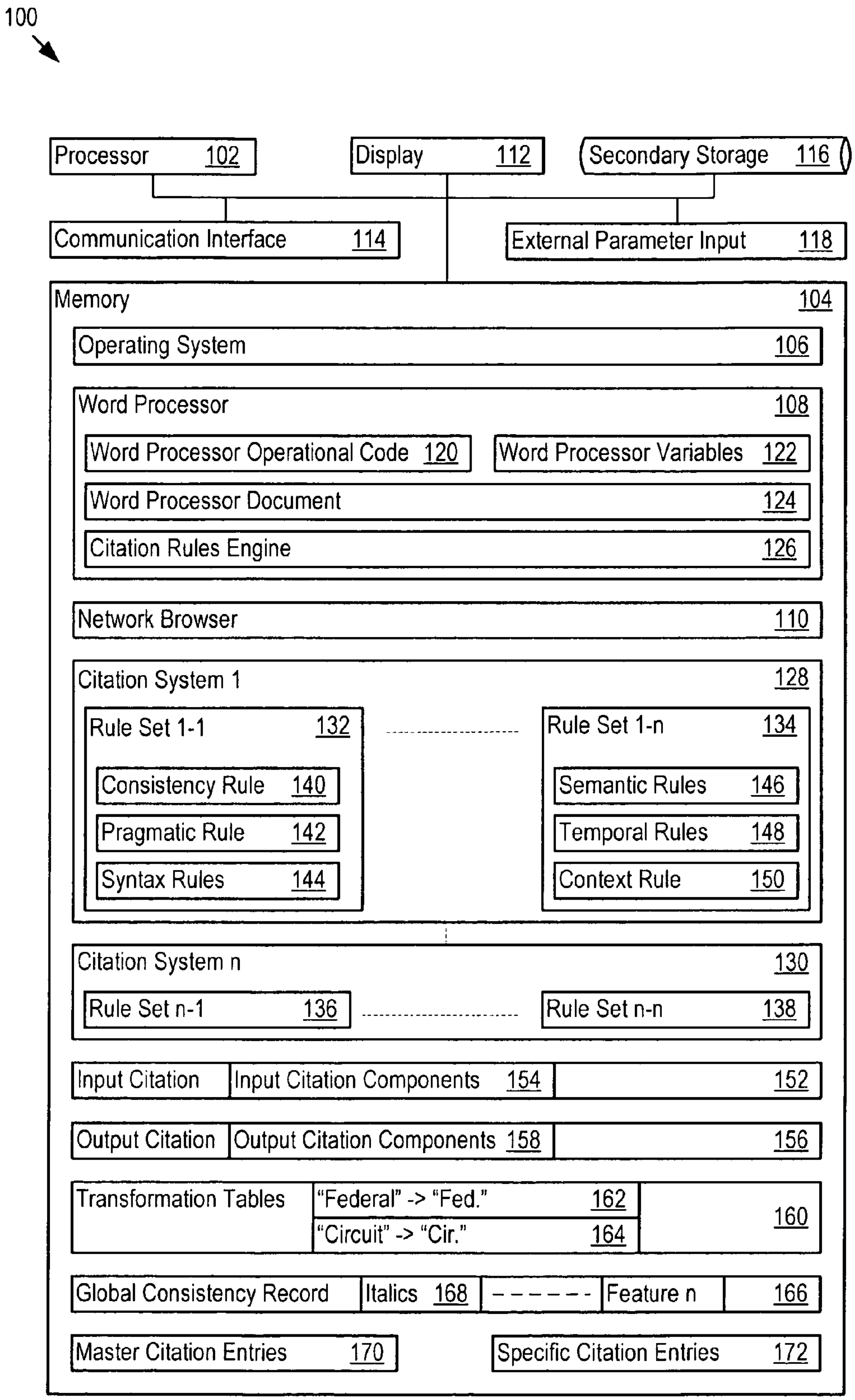
FIG. 1 shows a citation processing system.

FIG. 1 shows a citation processing system with a multiple rule set engine 100 ("system 100"). The system 100 provides a writer with great flexibility in transforming citations between citation systems, and also examines and corrects citations for proper adherence to any selected citation system. The system 100 includes a system processor 102 and a system memory 104. The system 100 executes an operating system 106 that may control the execution of other programs in the system, such as the word processor program 108 or a network browser program 110 (e.g., an Internet browser), as examples.

The system 100 may include a display 112, a communication interface 114, and secondary storage 116. The system 100 may also include external parameter inputs 118. The system 100 may generate a user interface on the display 112 to provide, as an example, a selection menu of available citation systems, a selection menu of electronic documents in which to analyze or transform citations, or an input element (e.g. a text field entry element) that accepts cites, citation components, or other data.

The communication interface 114 may be an interface to a local or remote network, including the Internet. The system 100 may accept citation analysis or transformation requests, input citations, or electronic documents that include input citations, as examples. To that end, the system 100 may function as a citation transformation server that processes citation analysis and transformation requests and returns output citations, modified electronic documents, or other data to the service requester. The external parameter input 118 may be implemented as a keyboard, a speech recognition interface, a mouse, or other input mechanism.

The operation of the system 100 is discussed below in the context of the word processor program 108. However, the system 100 may operate on electronic documents for network browsers (e.g., web pages), spreadsheets, or any other electronic documents that includes an input citation to a source of information such as a federal reporter, legal periodical, technical periodical, or other source of information.

The word processor program 108 includes operational code 120, such as the instructions that implement the core functionality of the word processor. The word processor program 108 employs word processor variables 122, shown in the word processor memory space in FIG. 1. The word processor program 108 operates on the word processor document 124 ("document 124"). The document 124 may be a legal brief for a particular court, a legal opinion, or memorandum. The document 124 need not be legal in nature, and may, as additional examples, be a technical journal article, electronic slide presentation, white paper, html web page document, or any other document that includes citations to sources of information.

FIG. 1 shows that the word processor program 108 is extended with the citation rules engine 126. The citation rules engine 126 may be a plugin, for example. In other implementations, the citation rules engine 126 may be a separate program executed by the processor 102. The citation rules engine 126 may, for example, control any one or more of generation of a citation, transformation of a citation between citation systems, control stylistic presentation of a citation, and verification of the accuracy of a citation, and is described in more detail below.

The system 100 also establishes rule sets for multiple citation systems. In the example shown in FIG. 1, the system 100 includes one or more citation systems, each of which includes one or more available rule sets. FIG. 1 shows 'n' citation systems 1 (labeled 128) through 'n' (labeled 130) and 'n' rule sets 1-1 (labeled 132) through n-n (labeled 138) established in the 'n' citation systems.

Examples of citation systems include The Bluebook, The Association of Legal Writing Directors (ALWD) Citation Manual, and The Chicago Manual of Style. Citation systems may be hybrid citation systems. Hybrid citation systems may incorporate citation rules from widely recognized citation systems (e.g., The Bluebook) as modified or extended by custom citation rules, such as specific citation forms for a local court. Similarly, citation systems may be fully custom citation systems in the sense that the associated rule sets need not adhere in any respect to any "authoritative" recognized citation system. As described in more detail below, any rule set may include consistency rules 140, pragmatic rules 142, syntax rules 144, semantic rules 146, temporal rules 148, context rules 150, or other types of citation rules. The citation rules govern how citations should conform to a particular citation system.

FIG. 1 shows that within a given citation system, there may be multiple available rule sets. For example, in The Bluebook citation system, an available rule set may be provided for multiple editions of The Bluebook. Alternatively, each edition of The Bluebook (or any variant of any citation system) may be considered and implemented as a separate citation system. Furthermore, the citation systems and/or rule sets may be established in and accessed from other memories, including databases, that are either local or remote with respect to the system 100.

In one role, the system 100 operates on input citations 152 that include input citation components 154 to produce output citations 156 that include output citation components 158. The system 100 applies rules that the system 100 may dynamically select by reading the rules from a memory, by selecting rules built into a software program, or by obtaining the rules from other sources. Application of the rules in question may, for example, control any one or more of generation or alteration of a citation, control stylistic presentation of a citation, and verify the accuracy of a citation. The citations may be present in an electronic document, such as those noted above.

The citation rules engine 126 may accept an input citation, determine the rule set to apply, gather information required to create an output citation, analyze the context in which the output citation will appear, and generate an output citation adhering to a selected citation system. The citation rules engine 126 may also insert the output citation into an electronic document and maintain the correctness of any citations in a document (e.g., by transforming the citation from one citation system to another) as changes occur that affect the proper citation format, including changes of selected citation system and insertions, deletions, and modifications of other citations.

The citation rules engine 126 may also gather required and optional citation components to assist with the determination of an output citation. The citation components may include case names, party names, page references, reporter names, journal names, year references, subsequent history, abbreviations, or any other component of a citation that adheres to the selected citation system. To that end, the system 100 may obtain the citation components by accepting input from the writer (e.g., through a text input box). Alternatively or additionally, the system 100 may obtain the citation components by searching local or remote files, databases, web pages or servers, or other sources. For example, given an input citation that specifies a reporter volume and page, the system 100 may search a database of reporter data to find the case name that appears in that volume and on that page. The citation rules engine 126 may also define the context in which the input citation appears according to the type of document; whether a citation to the current source has been cited in other places in the document, based on structural elements such as headers or other citations that appear between the current citation and other citations to the same source, or based on other factors.

The system 100 may create output rules and citation systems, encode output rules and citation systems, select citation systems and output rules, and apply output rules and citation systems. Rule sets may be created and/or grouped into citation systems prior to creating or editing the document 124, while creating the document 124, or after the document 124 is created.

Figure 2:
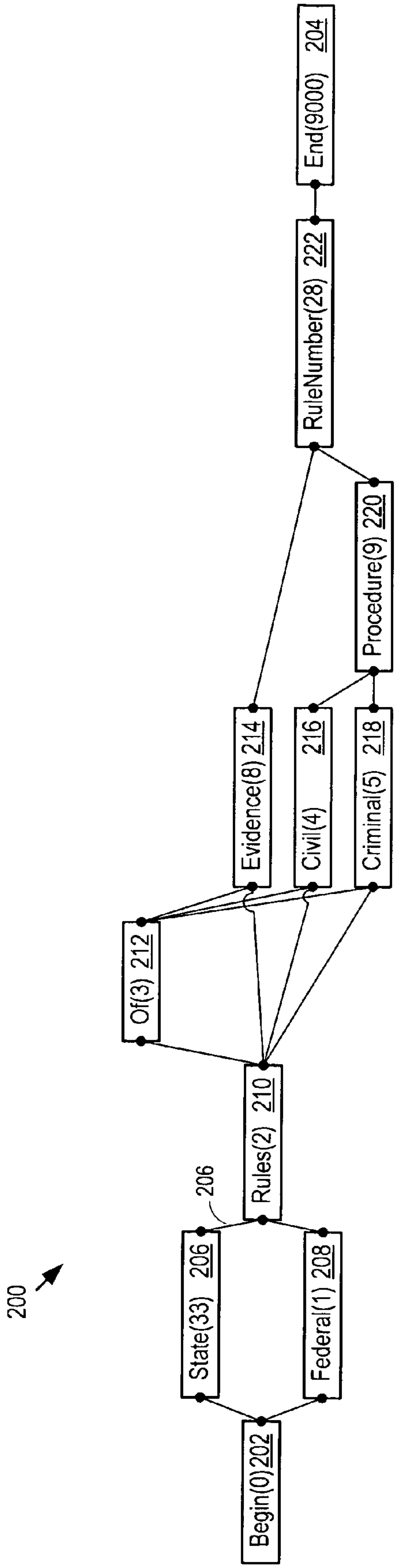
FIG. 2 illustrates a citation rule that may be included in a rule set for a citation system.

An output rule may control relationships between elements of a citation. FIG. 2 shows a graphical representation of an output rule 200 that describes the components of a citation and shows the relationships between those components. The components of the citation in the example shown in FIG. 2 are the words of the citation. The output rule 200 encodes the citation components as nodes in a graph, including a Begin node 202 and an End node 204.

Connections between nodes, such as the connection 206, show relationships between the words. The output rule 200 shows one way to encode a citation to specific evidence, civil, or criminal rules. The output rule 200 includes a State node 206, a Federal node 208, and a Rules node 210. The output rule 200 also includes an Of node 212, an Evidence node 214, a Civil node 216, and a Criminal node 218. A Procedure node 220 and a RuleNumber node 222 follow. A node identifier is shown in parentheses in each node.

Figure 3:
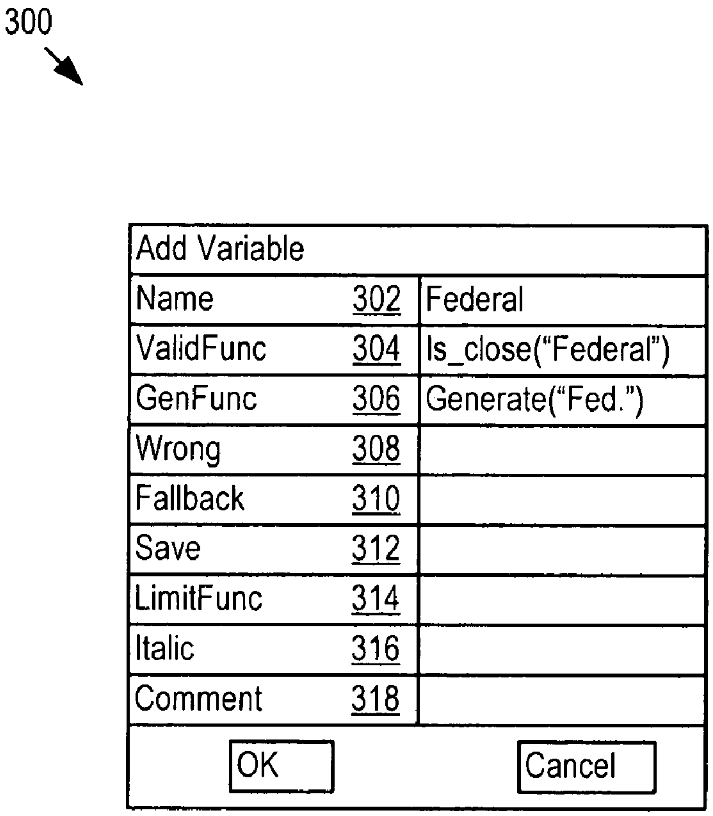
FIG. 3 depicts node attributes for the federal node in the rule graph shown in FIG. 2.
Figure 4:
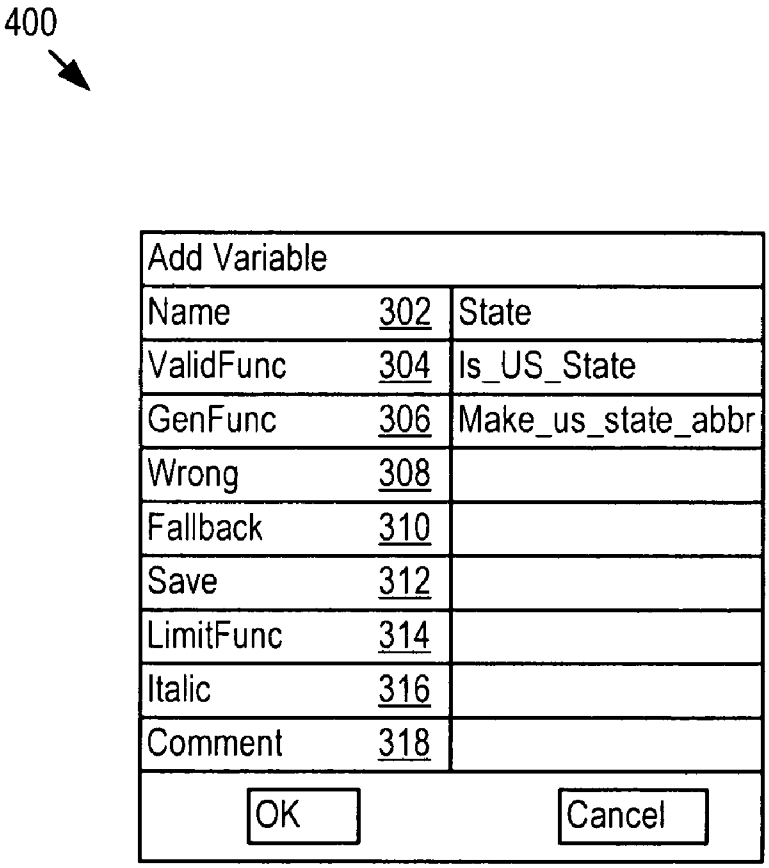
FIG. 4 shows node attributes for the state node in the rule graph shown in FIG. 2.

An output rule may control the attributes that particular components may or may not have. FIGS. 3 and 4 show attributes 300 and 400 for the federal node 208 and state node 206, respectively, of the nodes in FIG. 2. They way in which the attributes enforce citation characteristics (e.g., permissible volume or rule numbers) is explained below.

Table 1, below, gives an explanation of each attribute.

TABLE 1

| Field | Explanation |
|---|---|
| Name | The name of the node |
| ValidFunc | The name of a validating function that checks whether a candidate citation component matches the node. |
| GenFunc | The name of a function that generates the citation component for this node. The generated citation component replaces the string that the writer entered (e.g., by replacing "Procedure" with "P.") to generate a citation component in the output citation that adheres to the selected citation system. |
| Wrong | A description is provided below. |
| Fallback | A node may have the fallback flag set (e.g., <Fallback>1</Fallback> to indicate that, should all other graph paths fail, the system 100 should continue processing the graph forward from the fallback node. As a result, the system need not repeatedly incur substantial processing costs to repeatedly process parts of a graph. Instead, the system may continue forward from the fallback node, which may include a validation rule that accepts any input (thereby allowing the system to continue forward regardless of the current position in the input citation). |

TABLE 1-continued

| Field | Explanation |
|---|---|
| Italic | This field may be empty when the citation component does not require special formatting such as italics or underlining. Citation components that should include the formatting may be marked with an integer, for example. The system may extend formatting between citation components marked with the same integer. Thus, for example, the first party name component, the "v." component, and the second party name component may each be represented in the graph with an <Italic> field set to "1". The system may then extend a continuous underline under all three of the components when generating the output citation. The same citation may include multiple citation components that are grouped together with different integers, calling for multiple instances of extended formatting in the same citation. |
| Comment | A comment field for general purpose use. |

Six examples of attributes that the output rule may analyze and control include syntax, semantics, temporal, context, consistency, and pragmatics attributes. Each of these is described below. Note that some of these attributes may involve relationships between nodes. For example, the consistency rules may establish a relationship between two or more nodes that specifies that nodes remain consistent with each other. The consistency rules may also apply in a global sense, such as at the document level. To that end, the system 100 may maintain a global consistency record 166 of citation characteristics that should apply to each citation in the document. In the example shown in FIG. 1, the global consistency record 166 has established that an italic citation characteristic 168 should apply to each citation in the document. The system 100 may determine the global citation characteristics by prompting the writer for input, reading configuration files, checking configuration settings, by analyzing citations and taking, for example, the formatting or other features used with the first citation found in a document, or in other manners.

Figure 5:
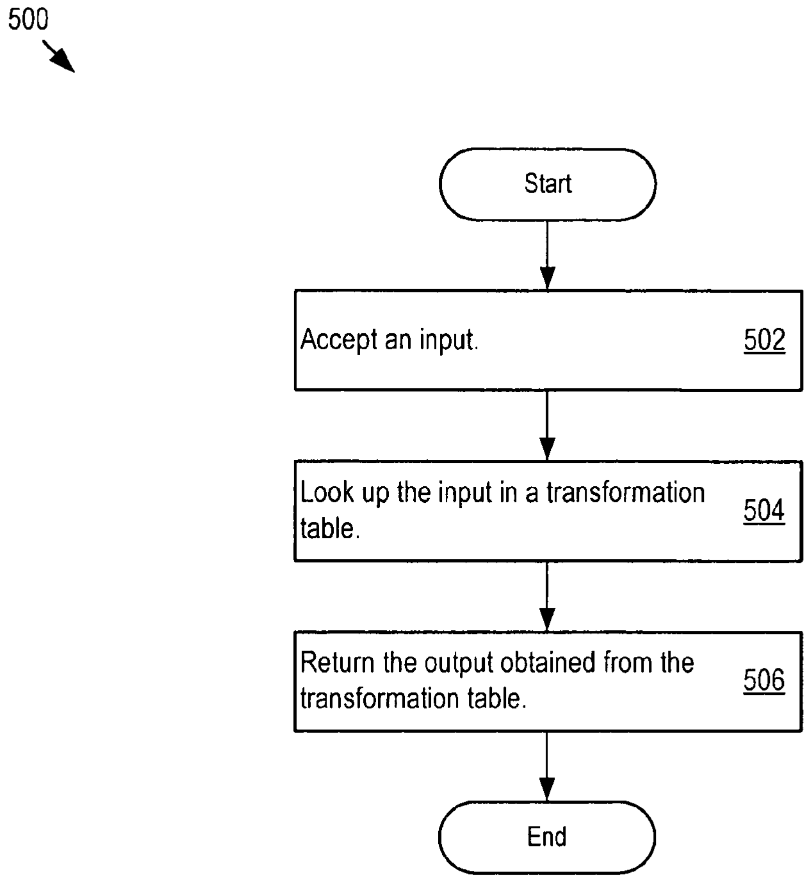
FIG. 5 shows the logic that the system may implement to transform an input to an output.

An output rule may also specify a transformation that maps an input to an output. FIG. 5 shows the acts 500 that the rules engine 126 may take to apply a transformation rule. The rules engine 126 accepts an input (Act 502). The input may be a citation component such as "Federal" or other input. The input may be an input citation that the system 100 has processed as described below to determine that the input citation falls within a particular citation system. The rules engine 126 looks up the input in a transformation table 160 that implements mappings (e.g., the mappings 161 and 164) of inputs to outputs (Act 504). The transformation table 160 may implement, for example, specific transformations of citations or citation components between pre-determined citations systems (e.g., The Bluebook and the Maroonbook).

The transformation may take many forms. In one implementation, the transformation table 160 includes a table that maps an input to a result, such as a table of state names and/or abbreviations for one citation system to the state names and/or abbreviations used in another citation system. The transformation table may also be a database that performs a lookup on complete or incomplete data, and that returns transformed data based on the database search results. For example, the database may include lookup logic that queries on an input citation such as "vanorden v governor perry", first changing the input citation to "Van Orden v. Perry" and then, based on search results, obtains the output citation "Van Orden v. Perry, 545 U.S. 677, 125 S. Ct. 2854, 162 L. Ed. 2d 607 (2005)". The rules engine 126 returns the output (Act 506).

The system 100 may access or maintain a name database of public figures, well-known individuals, or other persons whose names are expected to appear in citations. For example, the name database may include the names of past and present governors, IRS, FTC, or other government commissioners, presidents, secretaries, and other public figures. The system 100 may also analyze the citation for public figure keywords, such as "governor", "president", or "commissioner".

When the system 100 recognizes a name or keyword, the system may transform the input citation to adhere to the selected citation system. For example, the system 100 may delete the word "governor", lookup "perry" in the name database, and insert "Perry" in the output citation. In other implementations, the system 100 may prompt the writer for the name to use in the output citation, optionally including a list of names to choose from that the system 100 retrieved from the name database (e.g., "Perry", "Pery", or "Pearie"). The system 100 may update the name database with the input obtained from the writer, and may also establish a record that the input citation component (e.g., "governor perry") transformed, in the past, to the particular output citation component (e.g., "Perry"). The system 100 may make future transformations or transformation suggestions based on the records of past transformations.

In addition, the system 100 may include a rule (e.g., a syntax or semantic rule) that governs the transformation of this particular citation component. For example, the rule may establish that the word "Governor" should not exist in the output citation. Such a rule may be used to form the output citation in keeping with The Bluebook rule 10.2.1(e), for example.

Figure 14:
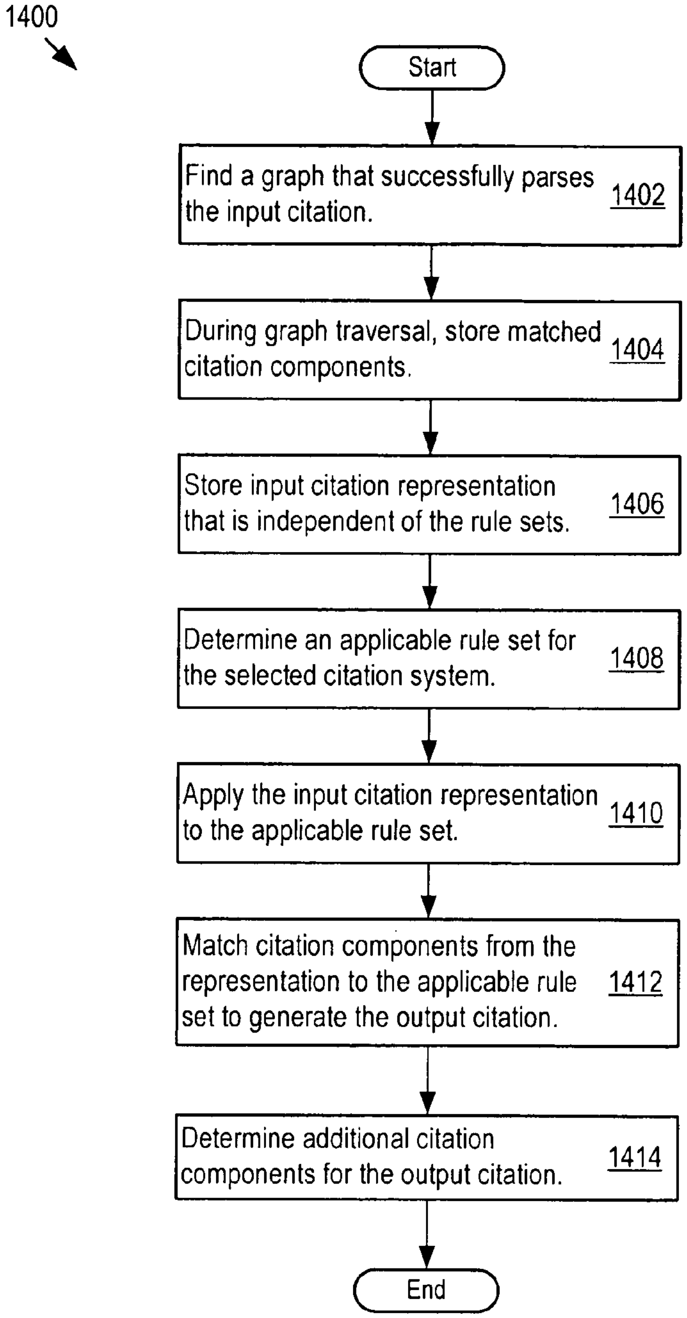
FIG. 14 shows the logic that the system may implement to transform an input to an output.

In addition to the example shown in FIG. 5, FIG. 14 shows another example of the acts 1400 that the rules engine 126 may take to transform between citation systems. The rules engine 126 analyzes the input citation to find a graph that successfully parses the input citation (Act 1402). In other words, the rules engine 126 attempts to find a path through a graph that recognizes or validates the input citation or citation component. During graph traversal, the rules engine 126 stores and remembers recognized citation components (Act 1404). For example, in "Fed. R. Civ. P. 11", the rules engine 126 records that the input citation includes a rule number with value 11 (e.g., the RuleNumber node matches the "11" portion of the input citation). After parsing the input citation, the rules engine 126 stores a representation of the input citation that is independent of all rule sets.

The representation may be, for example, the set of recognized citation components, and an identification of the type or nature of the input citation (determined, e.g., by which graph was successfully parsed). In other implementations, the representation may include master citation entries 170 and specific citation entries 172. The master citation entries 170 may include the citation components that apply to each citation to a particular source of information. For example, the master citation entry for a citation to a specific case may include party names, year, reporter volume, and any other citation components that are true for the source of information. Master citation entries 170 may exist for citations to cases, regulations, statutes, constitutions, and other sources of information.

The specific citation entries 172 may store a reference back to a master citation entry, and information specific to the citation. For example, the specific information may be a pin page cite or a parenthetical explanation that applies to the specific citation. When a particular source of information is first cited, the system 100 may create a corresponding master citation entry (if one does not already exist for that source) as well as a specific citation entry. Subsequent cites to the same source generate additional specific citation entries 172. As a result, the system may efficiently make global changes to source information, without changing numerous specific citations.

Given the selected citation system and applicable rule set (Act 1408) the rules engine 126 transforms the input citation, using the representation, to adhere to the selected citation system. To that end, the rules engine 126 may apply the representation to the applicable rule set (Act 1410). More specifically, the rules engine 126 may match the citation components in the representation to the citation components present in the applicable rule set for the identified type of input citation to generate the output citation (Act 1412). For example, the applicable rule set may include a rule number node. The rules engine 126 may then retrieve the rule number found in the input citation, and use the rule number in the position specified in the applicable rule.

The system 100 may also determine additional citation components for the output citation (Act 1414). The additional citation components need not be found in the input citation. For example, the additional citation component may be information that the selected citation system requires in a case citation, but that the input citation does not include because the information is not mandatory in the citation system of the input citation. The system 100 may generate the additional citation components based as specified in a rule set, may query an external database for the additional citation components, may prompt for the additional citation components, or may obtain the additional citation components in other manners.

Syntax Rules

A syntax rule specifies the internal structure that a value should adhere to. One example of a syntax rule is a rule that specifies that only one particular value is acceptable. Another example of a syntax rule is a rule that specifies that any string of words or numbers that form a grammatically correct sentence is acceptable.

Semantics Rules

A semantic rule specifies the meaning that a value should have. An example of a semantic rule is a rule that specifies that a date has the form of a month followed by a number that specifies a day within that month. "February 31" may be a syntactically correct date, but it is semantically wrong because the number following the month is supposed to indicate a particular day of that month and February never contains a 31st day.

Temporal Rules

A temporal rule specifies time constraints that a value should meet. An example of this is Bluebook Rule 10.7.1(d), which states that "cert. denied" should not be used on cases decided more than two years before a citation is written. "United States v. Baxter, 492 F.2d 150 (9th Cir. 1973), cert. denied, 416 U.S. 940 (1974)" is syntactically and semantically correct, but it would be temporally incorrect if written today because the case was decided in 1973. The citation would have been temporally correct on a citation written in 1974.

Context Rules

A context rule specifies the context in which a rule is or is not applied. In some citations systems, for example, once a source has been cited in full form, all future citations to the same source should be in short form. However, some citation systems also include a context rule that specifies that if there is a chapter break between the first citation and a second citation, the second citation must again be rendered in full form. Such a rule is a context rule because it states the context in which the rule applies. Another example of a context rule is to convert citations into hyperlinks to a remote information source when the electronic document in preparation is a Hypertext Markup Language or other web page document.

Consistency Rules

A consistency rule specifies that a citation component must be in the same form as some other citation component or citation component characteristic. For example, a consistency rule may specify that the names of court cases may be underlined or italicized, but also require that the same form be used throughout a document.

Pragmatics Rules

A pragmatic rule specifies how a value is processed. For example, in The Bluebook citation system, the names of months are always abbreviated in federal court filings according to table T.12. As a result, the first month of the year must be presented in a document as "Jan." regardless of whether a writer uses "January", "Jan.", or "Jan" in the citation entered in the document.

The rules in the rule sets may be encoded in many different ways. In one implementation the rules may be encoded in data files. In other implementations, the rules may be encoded as executable instructions in the rules engine 126 or other program in the system 100. Graphs, executable instructions, or other logic or combinations of logic may implement the rules described above. For example, the structure of a graph may itself represent proper syntax. As another example, semantic rules (e.g., February cannot have a day value greater than 28 unless the year is a leap year, in which case the day value 29 is also allowable), may be implemented with a post-processor function.

Figure 15:
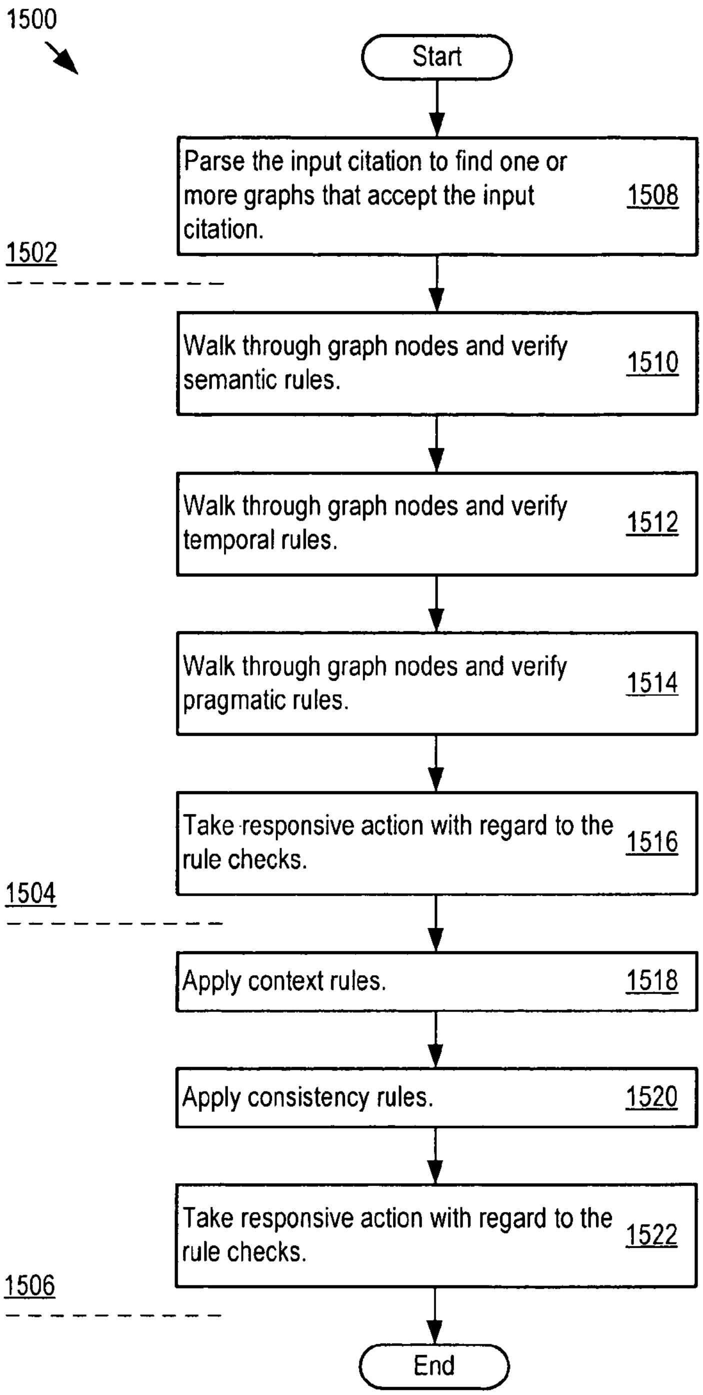
FIG. 15 shows the logic that the system may implement to divide processing flow into multiple phases, including a validation phase, a post-processing phase, and a generation phase.

In one implementation, as illustrated in FIG. 15, the system 100 divides the processing flow into three phases 1500: validation 1502, post-processing 1504, and generation 1506. The validation phase may include parsing the input citation to find one or more graphs that accept the input citation (Act 1508). In validation, "Feb. 31, 2007", for example, may pass the syntactic check.

In the post-processing phase, the system 100 may walk through each graph node and verify that semantic rules are met (Act 1510). In this example, the system 100 may determine that February cannot have a 31st day. The post-processing phase may also perform other rule checks, such as temporal rule checks (Act 1512) and pragmatic rule checks (Act 1514). As one example, the post-processing phase may determine that a subsequent history provided in the citation is not appropriate (e.g., because more than 10 years have passed, yet the citation includes a "cert. denied" component). As another example, the post-processing phase may enforce the pragmatic rule that "February" is given as "Feb." in the output citations. For any rule that is not met, the system 100 may take responsive action, such as prompting the writer for a correction, marking the citation as semantically defective, inserting a warning note, label, or text into the source document with the citation, or taking other actions (Act 1516).

The generation phase 1506, the system 100 may apply context rules (Act 1518) and consistency rules (Act 1520). As examples of enforcing consistency, the system 100 may apply the consistency rules that italics or underlines are used throughout the citations, and that "in banc" or "en banc" are consistently used. As one example of enforcing context, the system 100 may generate a citation to a case in full, short, or Id. format, depending on what contact requires. Thus, the system 100 may also take responsive action with regard to the rule checks made in the generation phase 1506 (Act 1522). Nevertheless, the system 100 may continue to store the full citation for future reference, even though a short form such as Id. is generated in the document.

In other implementations, the graph nodes may be extended with additional functionality to handle the post processing phase. For example, a graph node may specify a post processing function, using XML tags (e.g., a <PostProcessor-Func> tag pair). The system 100 may then call the post processor functions specified in the graph. Furthermore, the system 100 may apply different rules in different phases, may implement additional, fewer, or different phases, may execute any of the phases in parallel or in sequence, may forgo executing any specific phase, or may implement the processing noted above in many other ways.

FIG. 6 shows an example encoding 600 of the Begin node 202, Federal node 208, Rules node 210, and the Of node 212. The <Citation_Graph> lines specify that the encoding 600 is a graph that describes a rule in XML form. The nodes are delineated by the <Node> tag pair 602, given a name with the <Name> tag pair 604, an identifier with the <ID> tag pair 606. The encoding 600 also specifies a node type with the <Node_Type> tag pair 608 and the screen coordinates at which the node is preferably drawn on the screen when the system renders a visualization of the graph, with the <Screen_Coordinates> tag pair 610. Each node may have a type that specifies the role played by the node. For the Begin node 202, the node type is BeginGraph, a type of node that marks the beginning of a graph.

Other Node_Type fields include Variable nodes and Constant nodes. The Variable nodes may have associated validator functions that will accept many different values. For example, the Federal node validator function may accept "Fed.", "Fed", and "Federal". A Constant node may have a Validator function that accepts a single specific value (e.g., the string "of").

The encoding 600 also specifies the node identifiers of nodes in the graph that lead to this particular node with the <Lines_In> tag pair 612. A validator function is specified with the <Valid_Func> tag pair 614, and a generator function is specified with the <GenFunc> tag pair 616. Additional examples in the encoding 600 include a specification of the specific value of the citation component using the <Value> tag pair 618 and that a citation component should be accepted, but not generated by using the <Wrong> tag pair 620.

When a node has the <Wrong> tag set, the system 100 will not move through that node any further through the graph when generating a citation. Thus, the <Wrong> tag acts as a block to generating incorrect output. Instead of proceeding through the node, the system proceeds down an alternate path through the graph that generates a correct citation.

However, the system 100 may accept a citation component that is incorrect when processing an input citation, then set the <Wrong> tag on that node to prevent incorrect subsequent output. For example, the citation "(2d Cir., 1969)" should not include a comma after the "Cir.". Nevertheless, the system 100 may accept "Cir.," as part of the input citation knowing that "Cir." is correct. Thus, the graphs may include nodes that capture common mistakes in citation, or other errors, without rejecting the input citation and without generating incorrect output citation components.

Additional, different, or fewer tag pairs may be used to define a rule. Other representations including database tables, relations, name-value pairs, and others representations may be used to define the rules. Further, although the example given here shows the rule represented in plain text, the rule may also be stored as compressed, encrypted, or otherwise transformed for purposes of optimization, security, ease of use in different environments, and to achieve many other objectives.

FIG. 7 shows an encoding of the rule as executable instructions in a computer program. The instructions in FIG. 7 are Java instructions. The first line 702 declares a method that will return the value 'True' when the method is given a citation that conforms to the rules of the "procedural_rules" citation form. Otherwise the method returns 'False'. The second line 704 saves a copy of the citation so that if the method does not recognize the citation, the method may restore the citation to its original form, optionally to be checked against different citation forms.

The next two lines 706 determine whether the input leads with a state or something close to the word "Federal". The lines 706 perform the analysis specified in the first decision in the graph of FIG. 2 that accepts a state or something close to the word Federal. In this example, "recognize state" and "recognize_federal" are the validator functions. If both validator functions reject the input, then the original value of the citation is restored at line 708 and control is returned to the caller with an indication that the input does not correspond to the procedural rules citation form at line 710. If one of the validator functions accepts the input then the method proceeds to the next statement that will continue working through the rule graph and checking the citation.

Figure 8:
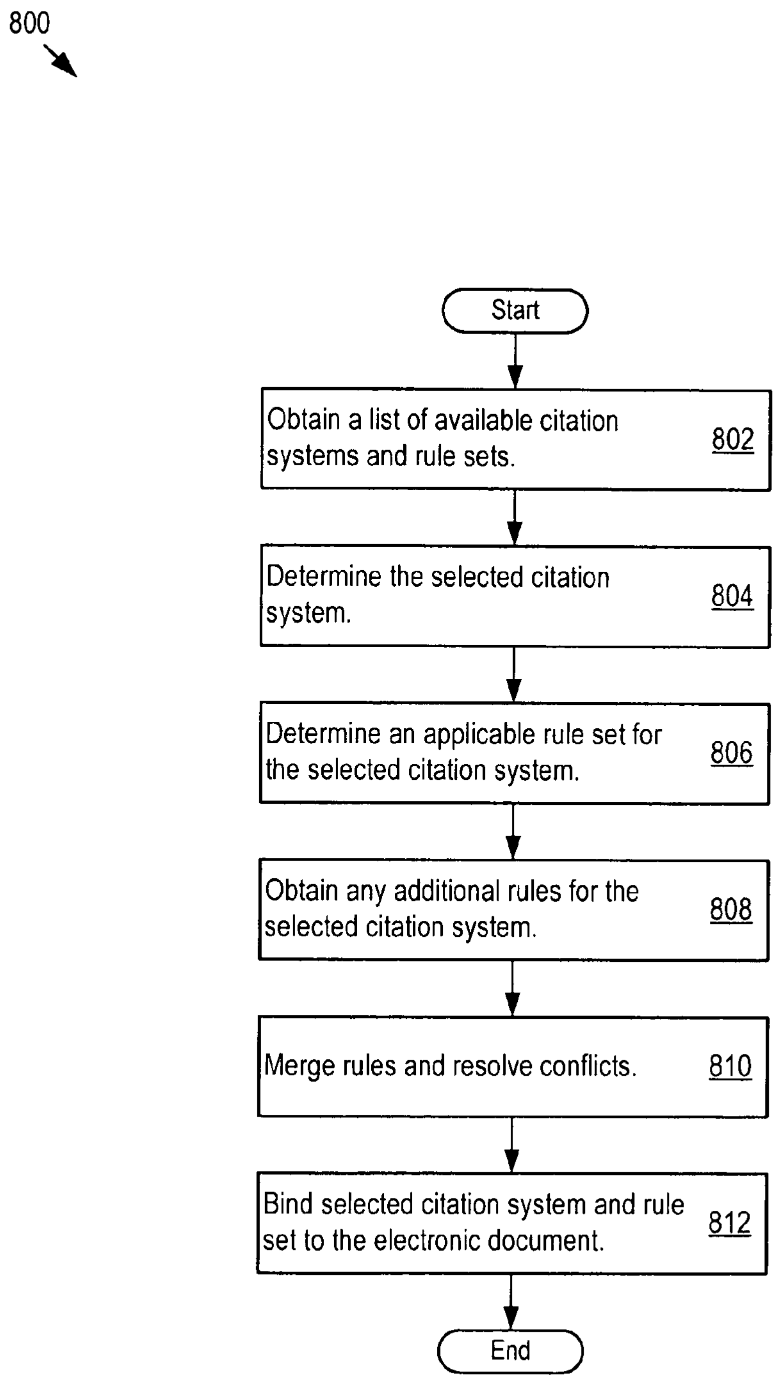
FIG. 8 shows the logic that the system may implement to select a rule set for application to citations.

The system 100 provides the writer with the ability to flexibly specify a desired citation system and flexibly change citation systems. FIG. 8 shows the acts that the rules engine 126 may take to determine the selected citation system and an applicable rule set for the selected citation system. The system 100 obtains a list of available citation systems and rule sets (Act 802). In doing so, the system 100 may search a database, consult a configuration file, check manually set configuration options, accept input from the writer, or in other ways.

The system 100 determines a selected citation system (Act 804). The system 100 may determine the selected citation system in many ways. As examples, the system 100 may prompt the writer for the desired citation system, prompt the writer for the purpose of the document, using a default selected citation system, analyze available information (e.g., header text or title page text that gives a court name or jurisdiction or configuration settings that specify the court) to infer the citation system to use, or determine the selected citation system in other ways.

The system 100 also determines an applicable rule set for the selected citation system (Act 806). The system 100 may determine the applicable rule set using the same techniques noted above for determining the selected citation system. For example, if the writer specifies The Bluebook citation system, the system 100 may prompt the writer for the particular edition of The Bluebook to use, and responsively access the rule set applicable for that edition.

The system 100 may also obtain additional rules for the selected citation system (Act 808). For example, the system 100 may prompt the user to enter any overriding rules that should be adhered to. As another example, the system may query an external authority (e.g., an external database of up-to-date rules) on the citation system to determine whether any rules for the citation system should be added, removed, or modified. The system 100 may then merge the rule changes and resolve conflicts with the existing rules established in the system 100 (Act 810). As examples, the system 100 may delete, replace, or update existing rules with the newly obtain rules using a first-in-time, last-in-time, or other technique.

The system 100 may apply rules and process added, deleted, or changes rules in several different ways. As examples, when the rules are obtained from a data file, the system 100 may read the rules into internal data structures, map them into memory, or gain access to them in other ways. When the rules are encoded in a computer program, the system 100 may load the rules into executable memory by opening them as a shared library, reading them into memory as an overlay, or gain access to the rules in other ways.

Once the citation system and application rule set are determined, the system 100 may bind them to the electronic document (Act 812). As examples, the system 100 may write a configuration file, insert citation system and rule set specification information into the electronic document, or otherwise bind the citation system and rule set to the electronic document. As a result, the citation system and rule sets may follow the electronic document, without the need for the writer to again specify the desired citation system or applicable rule set. Instead, the same citation system and rule set may be used each time the document is opened.

The rules engine 126 applies the applicable rule set to input citations (e.g., all citations or selected citations in a document). The rules engine 126 may also insert an output citation (e.g., a corrected form of the input citation, or the input citation transformed into a citation in another citation system) into the electronic document or may communicate the output citation to other logic for insertion into the document (or any other purpose). The rules engine 126 may also insert the output citation into another document such as a Table of Authorities, add the output citation into a different place or multiple places in the document such as a Table of Contents, give the output citation to other logic for further processing, or other steps with the output citation. The rules engine 126 may communicate the output citation back to the entity that delivered the input citation, to another entity, or may take other actions with the output citation, such as tracking and compiling statistics on common problems with input citations.

FIG. 1 shows the rules engine 126 integrated into a word processor. The rules engine 126 need not be incorporated into any particular electronic document processor, however. The rules engine 126 may instead be a separate program, as one example.

Figure 9:
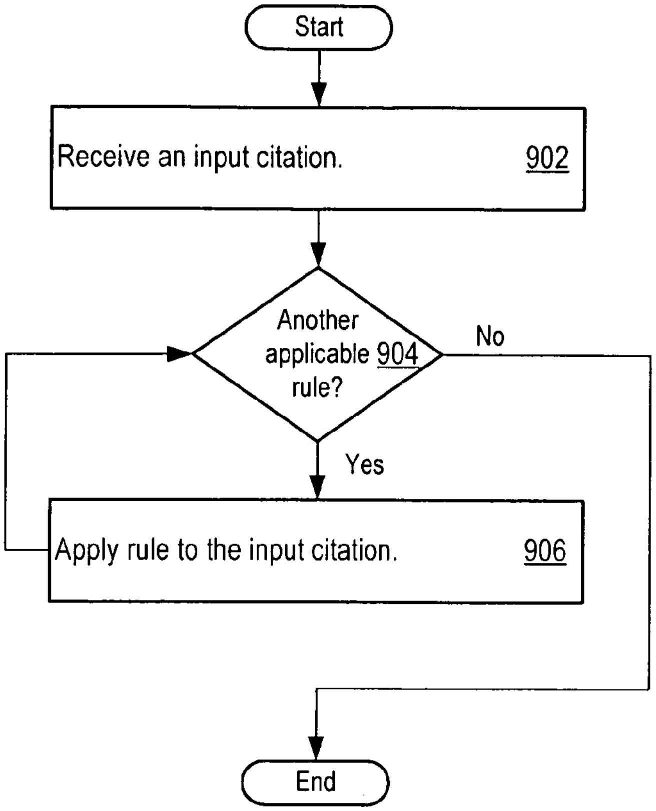
FIG. 9 shows the logic that the system may implement to accept an input containing a reference to a source that a writer wants to cite and process the input according to the currently selected citation system and applicable rule set.

FIG. 9 shows the acts that the rules engine 126 may take to determine output citations. The rules engine 126 receives an input citation (Act 902). The rules engine 126 may accept the input citation directly from a writer via a keyboard, voice recognition device, or other input device; from an interprocess message; from a communication received over the communication interface 114; by reading the input citation from an electronic document; or in other ways.

An input citation may take many forms including a correct or malformed citation, a nickname, an abbreviation, or any other data that allows the rules engine to transform the reference into a correct citation. Examples of references include, but are not limited to, the following: Watts v. United States, 394 U.S. 705, 706 (1969); Id.; Watts; 764 F.2d 143; Voting Rights Act of 1965; Sarbanes-Oxley; §1983; #1; C:\xyz.dat; madison v marbury; http://caselaw.lp.findlaw.com/cgi-bin/getcase.pl?court=US&navby=case&vol=000&invol=03-1500; and Llera Plaza II.

The rules engine 126 evaluates the input citation or other information to ascertain the applicable rules to apply (Act 904). The rules engine 126 may ascertain the applicable rules in one of several ways. As one example, the rules engine 126 may obtain from the writer a rule set selection of rules to apply to a given citation. Alternatively, the rules engine 126 may automatically analyze and recognize a given citation form and apply an applicable rule set automatically. When an applicable rule exists, the rules engine 126 applies the rule to the input citation (Act 906). The rules engine 126 continues checking for additional applicable rules until no more are found.

To recognize an input citation, the rules engine 126 may begin at the leftmost node of a citation rule graph (e.g., the graph 200) and process the graph from left to right. The rules engine 126 may move along the graph connections until the rules engine 126 reaches the rightmost node (a successful traversal of the graph). Consider the example of a citation to "Fed. R. of Evid. Rule 402". From the leftmost node, the Begin node 202, the rules engine 126 moves to the right into either the State node 206 or the Federal node 208. Multiple instances or threads of the rules engine 126 may process alternative graph paths simultaneously.

Each graph node includes a rule that controls the form that the citation component represented by the node may take. The rules engine 126 may enforce the rule with a validator function. A validator function may be implemented with processor executable instructions that compare an input with the rules for a particular node. If the validator function determines that the citation component conforms to the rules of the node, the validator function accepts the citation component, otherwise the validator function rejects the citation component.

The first word in the example is "Fed." To decide whether to move into the State node or the Federal node, the validator function for each node is executed. As shown in FIG. 3, the validator function for the State node is a function named is_US_state. The is_US_state validator function will use a list of state names and abbreviations to report that "Fed." is not the name of any US state. Therefore, the input "Fed." does not cause a transition into the node labeled "State". As shows in FIG. 3, the validator function for the Federal node is a function named is_close("Federal"), which validates that the input is close to the word "Federal." The validator function may apply a pre-selected distance metric, compare the input component to table entries of strings "close" to "Federal" or take other steps to determine whether the input component validates, thereby transitioning the rules engine 126 to the Federal node 208.

The next citation component in "Fed. R. of Evid. Rule 402" is "R." The validator function in the Rules node may be is_close("Rules") and may determine that "R." is close to "Rules", thereby transitioning the rules engine 126 to the Rules node 210. From the Rules node 210, it is possible to transition to the Of node 212, the Evidence node 214, the Civil node 216, or the Criminal node 218. Each of these nodes may also use an "is_close" validator function. In this example, the Of node 212 accepts the next citation component and the rules engine 126 transitions from the Rules node 210 to the Of node 212, and from there to the Evidence node 214 (or the Civil node 216 or Criminal node 218).

The Civil node 216 and Criminal node 218 transition to the Procedure node 220. To match the Procedure node 220, a validator function for the Procedure node 220 attempts to recognize the word Procedure, or a string that is close to, or otherwise validates for the word Procedure (as examples, "Proc.", and "P."). The validator function may be specified as noted above with regard to the other validation functions, for example, using XML to specify: <ValidFunc> is Close("Procedure")<NalidFunc>. The Procedure node 220 may include a generator function that specifies how the Procedure reference should appear in the citation. For example, the generator function may be specified with <GenFunc> Generate("P.")</GenFunc>. The system 100 thereby generates the correct output citation component "P." for the Procedure citation component, regardless of whether the writer entered “Procedure”, “Proc.”, or other string to indicate a Procedure component.

When the rules engine 126 arrives at the RuleNumber node 222, the associated validator function implements both syntax and semantic rule checks. The validator function may then determine whether the input citation component includes a number, but also that the number identifies one of the Federal Rules of Evidence. In the example, the citation component is “402”, which is in fact a valid rule of evidence, so rules engine 126 accepts the citation component and transitions into the End node 204. The End node 204 may mark the end of the graph and need not validate or consume any input. Given a successful graph traversal, the rules engine 126 may store status information that records the citation as a citation within the citation system(s) that includes the rule represented in the graph. The rules engine 126 may use this information as an aid in transforming the citation into an output citation that adheres to another citation system, for example by consulting transformation tables or graphs that specify conversion from one citation system to another.

Although selected aspects, features, or components of the implementations are depicted as being stored in memories, all or part of the systems, including methods and/or instructions for performing methods, may be stored on, distributed across, or read from other machine-readable media. The machine-readable media may include, for example, secondary storage devices such as hard disks, floppy disks, and CD-ROMs; a signal received from a network; or other forms of ROM or RAM either currently known or later developed.

Specific components of the system may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. Parameters, databases, and other data structures may be separately stored and managed, may be incorporated into a single memory or database, or may be logically and physically organized in many different ways. Programs and instruction sets may be parts of a single program, separate programs, or distributed across several memories and processors.

Figure 10:
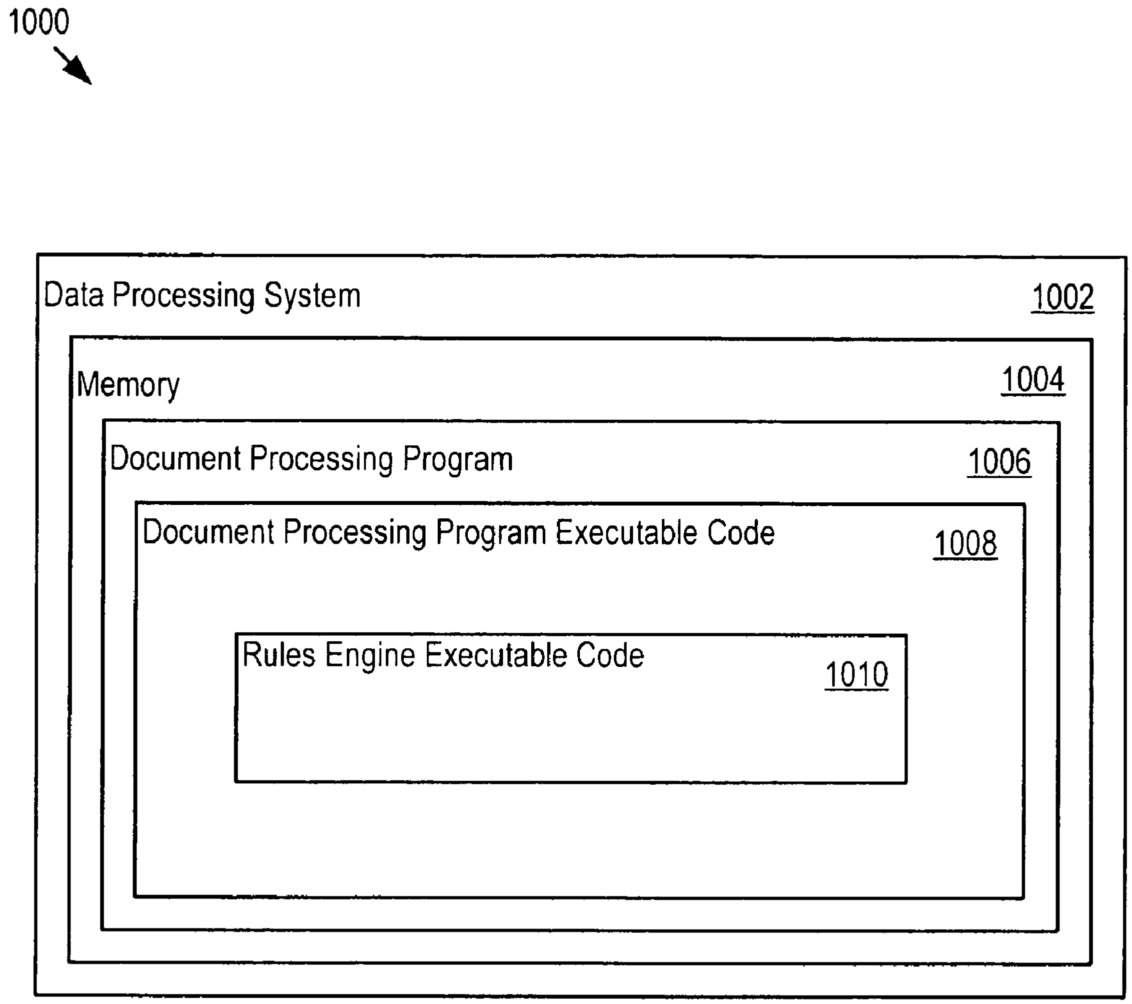
FIG. 10 depicts a system configuration in which the rules engine and the document processing program are in the same process in a data processing system and communicate via interprocedural calls such as function calls or intraprocess message passing.

FIG. 10 depicts an example implementation of a citation system 1000. In FIG. 10, the data processing system 1002 includes a memory 1004. The document processing program 1006 resides in the memory 1004, and includes executable code 1008 for document processing. The document processing program 1006 also includes rules engine executable code 1010 that implements the rules engine 126. The rules engine and document processing program may communicate through interprocedural calls such as function calls or intra-process message passing.

Figure 11:
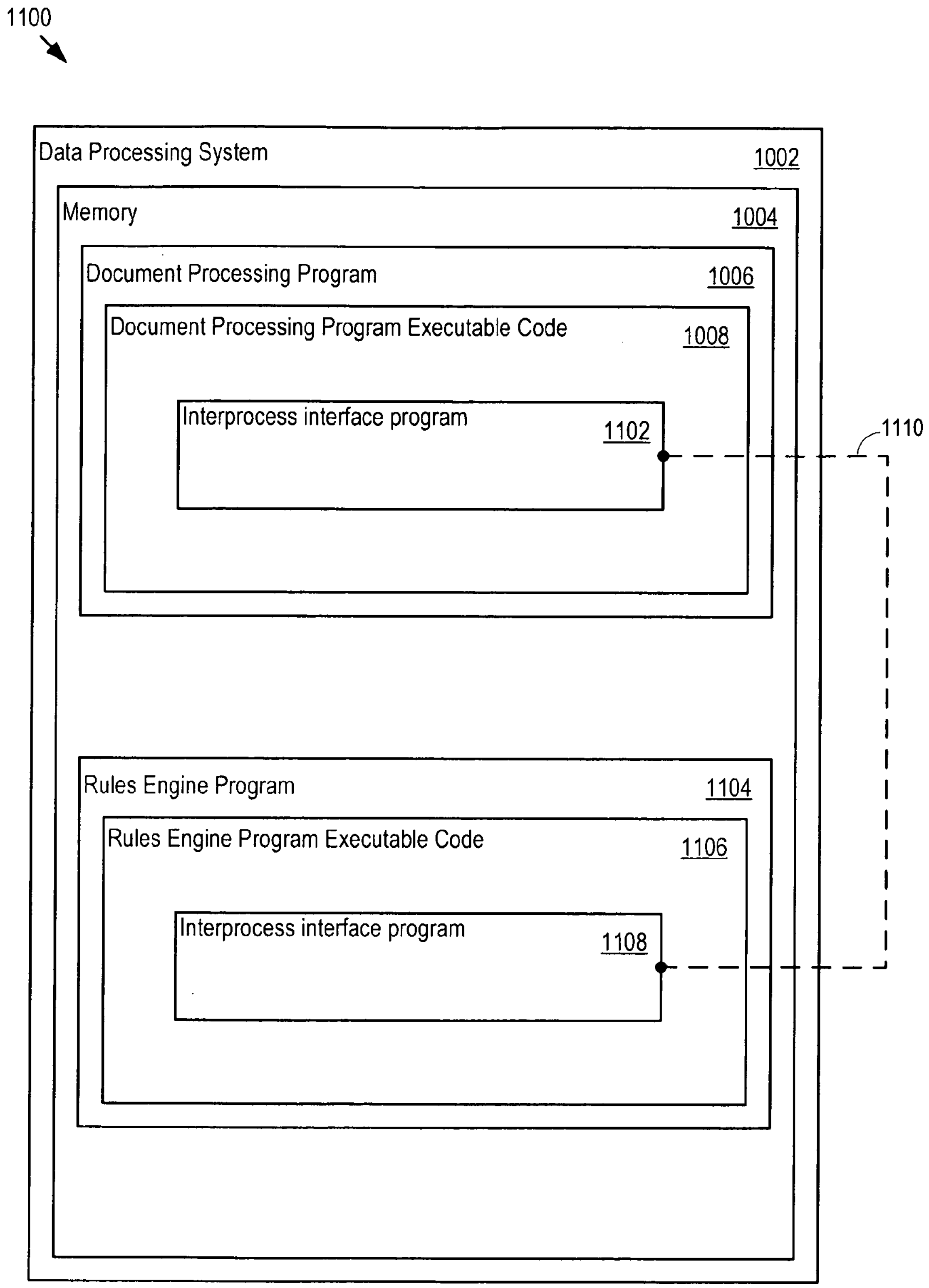
FIG. 11 depicts a system configuration in which the rules engine and the document processing program are in different processes on the same data processing system and communicate via interprocess communication methods such as shared memory or a message passing interface (MPI).

FIG. 11 shows a second example implementation of a citation system 1100. In FIG. 11, the rules engine program 1104, including rules engine program executable code 1106 and the document processing program 1006 are in different processes on the same data processing system 1002. The document processing program 1006 includes an interprocess interface program 1102 and the rules engine program 1104 also includes an interprocess interface program 1108. The programs 1006 and 1004 may send communications 1110 through the interfaces 1102 and 1008 using interprocess communication techniques including shared memory, a message passing interface (MPI), or another communication interface.

Figure 12:
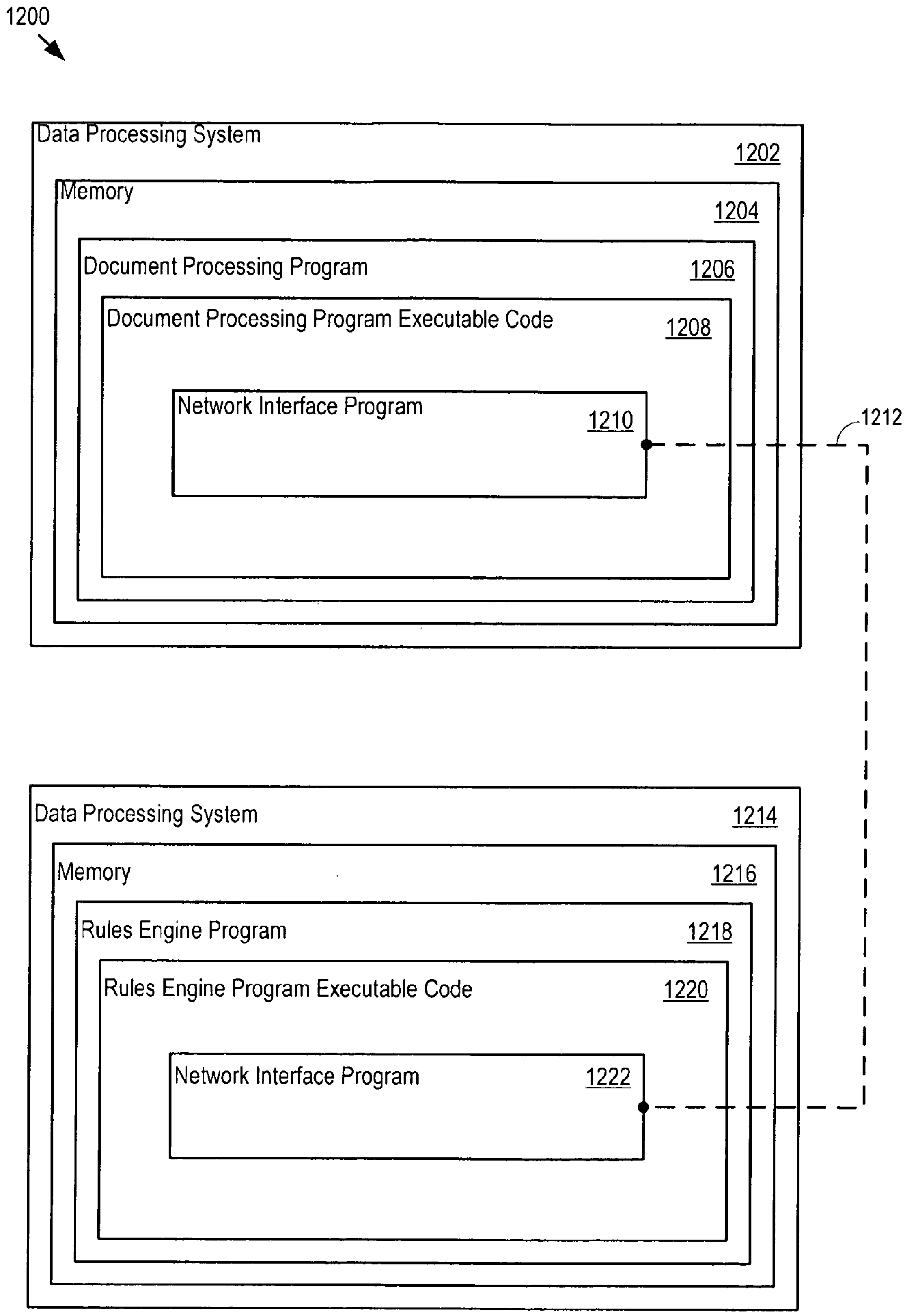
FIG. 12 depicts a system configuration in which the rules engine and the document processing program are in different processes on different data processing systems and communicate via network protocols such as TCP/IP.

FIG. 12 shows a third example implementation of a citation system 1200. In FIG. 12, a first data processing system 1202 includes a memory 1204. The memory 1204 holds the document processing program 1206, including document processing executable code 1208. Also included is a network interface program 1210. The network interface program 1210 may include instructions that transmit and/or receive messages 1212 to the second data processing system 1214.

The second data processing system 1214 includes a memory 1216 that holds the rules engine program 1218. The rules engine program 1218 includes rules engine program executable code 1220. A network interface program 1222 is also present, and includes instructions that transmit and/or receive the messages 1212 to the first data processing system 1202. The network interface programs 1210 and 1222 may implement the TCP/IP network communication protocol, or other messaging protocol.

In general, the systems described above may use a communication interface to exchange data, including input and output citations, citation components, electronic documents, service requests, rule sets, and other data. The communication interface may be implemented in many different ways. As examples, the communication interface may include physical layer elements, such as a network interface card, may include shared memory, interprocess communication code, a MPI, an application programming interface, message passing mechanisms, a dynamic link library (DLL), or other communication interfaces. The DLL, for example, may implement code that communicates data through the network interface card. As another example, the DLL may itself implement the rules engine 126, citation server logic, or rule sets. A service requester may then request citation services by calling functions provided by the DLL.

Figure 13:
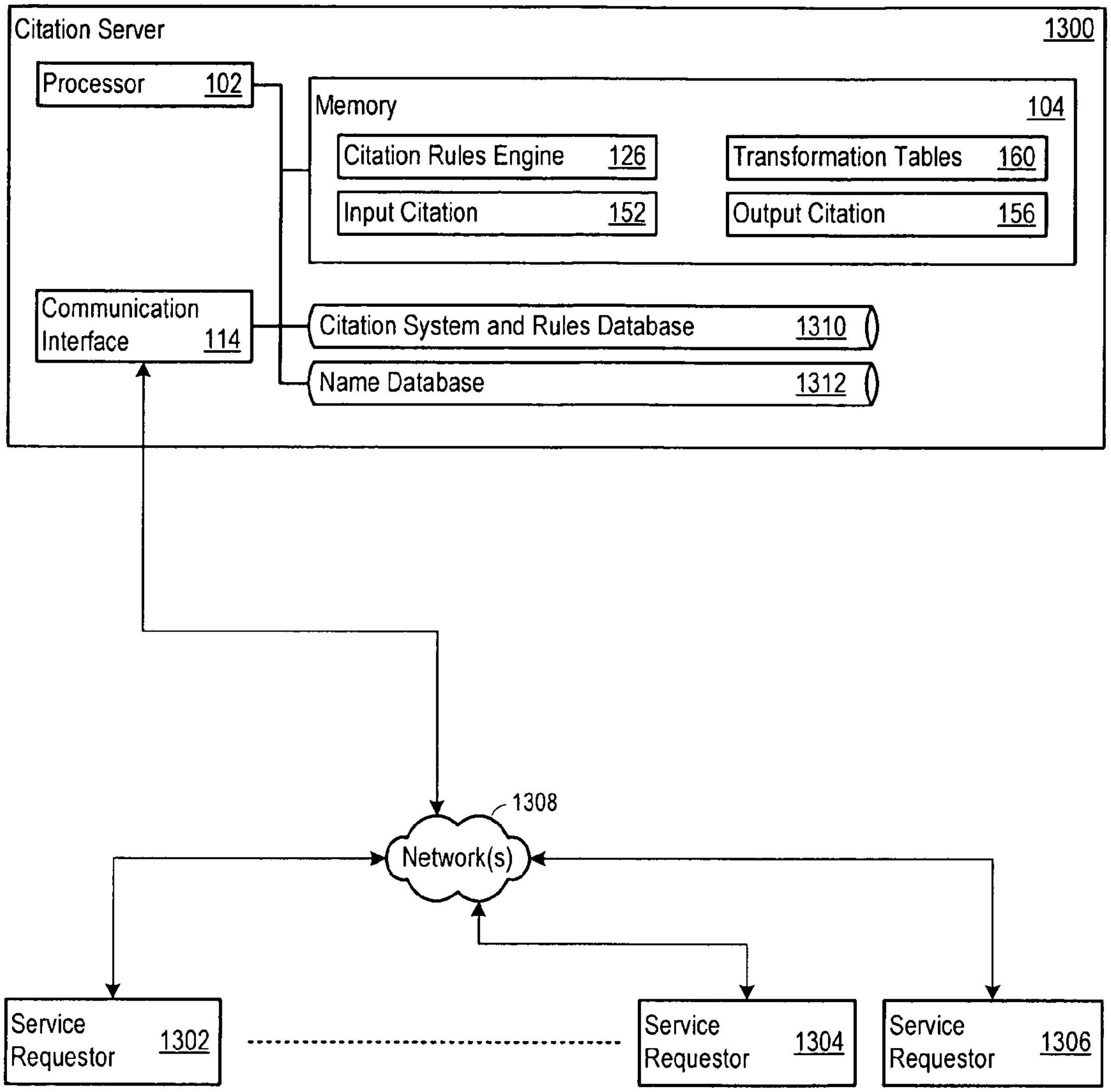
FIG. 13 shows a citation processing server in communication with clients that submit citations for parsing, error checking, correcting, or transformation to the citation transformation server.

FIG. 13 shows a citation transformation server 1300 in communication with service requestors 1302, 1304, and 1306 over the network(s) 1308 (e.g., the Internet or a Local Area Network). The citation transformation server 1300 includes a citation system, a rules database 1310 that stores the available citation systems and the applicable rule sets for the available citation systems, and a name database 1312 (described above). The service requesters 1302-1306 submit citation analysis, verification, error checking, and/or transformation requests to the citation server 1300. The requests may include individual citations, electronic documents with one or more citations, or other requests. The requests may include account information, such as billing account or other charging information that permits the citation transformation server 1300 to charge the service requestors a fee for processing the requests. The citation server 1300 processes the requests and returns the results to the service requesters 1302-1306.

This application is filed with and incorporates by reference a code appendix on CDROM. The code appendix provides XML definitions for case, statute, procedural, and other rules. Files that omit a “.h” component in their filename are graph files. Files that include a “.h” component in their filename are linkage files. The linkage files establish the availability of graphs that may be called from other graphs using graph call nodes. An example of a CallSubGraph node is shown in Table 2.

TABLE 2

```
<Node>
<id>109</id>
<data_type>CallSubgraph</data_type>
<x_coordinate>719.0</x_coordinate>
<y_coordinate>205.0</y_coordinate>
<dependencies>25</dependencies>
<Name>FRParenthetical</Name>
<Subgraph>FRParenthetical</Subgraph>
<Wrong></Wrong>
```

TABLE 2-continued

```
<Fallback></Fallback>
<Italic></Italic>
<Comment></Comment>
</Node>
```

The x and y coordinate entries specify where to display the node on a graphical user interface. The dependencies entry specifies the nodes the feed into this node. The <Subgraph> tag gives the name of the graph to call. The linkage file associated with the graph file specifies the node number for the name of the graph that is called as nodes may have identical names. An example of an entry in a linkage file is given in Table 3.

TABLE 3

```
<Member>
<Name>FRParenthetical.FRParenthetical</Name>
<Head>101</Head>
</Member>
```

The member entries each describe an external symbol (e.g., the name of a graph that may be called) In this example, the node 101 called FRParenthetical, is externally visible and can be referred to by a CallSubgraph node. In addition to the nodes described above, the graphs may include synchronization nodes. A synchronization node is an intermediary node that specifies connections between other nodes, operating, for example, as a many-to-many connector between input nodes to destination nodes, without having explicitly replicate every link desired from input to output. Table 4 shows an example of a synchronization node.

TABLE 4

```
<Node>
<id>285</id>
<data_type>Sync</data_type>
<x_coordinate>1196.0</x_coordinate>
<y_coordinate>3033.0</y_coordinate>
<dependencies>330,331,332,333,396</dependencies>
<Name>SyncWithoutComma</Name>
<Wrong></Wrong>
<Fallback></Fallback>
<Comment></Comment>
</Node>
```

In the example shown in Table 4, the SyncWithoutComma node, node 295, gathers together the flow from nodes 330, 331, 332, 333, and 396. Each of those nodes may then flow through this synchronization node to subsequent nodes. The subsequent notes specify node 285 as a dependency node.

Although selected aspects, features, or components of the implementations are depicted as being stored (e.g., as computer executable instructions or computer processable graphs) in computer readable memories, all or part of the systems, including methods and/or instructions for performing methods consistent with the system may be stored on, distributed across, or read from other computer-readable media. The computer-readable media may include, for example, secondary storage devices such as hard disks, floppy disks, and CD-ROMs; a signal (e.g., received from a network or received at an antenna); or other forms of ROM or RAM either currently known or later developed.

The logic described above may reside in the same or different threads, fibers, or other ways of organizing code and data within a process. Further, although certain logic may interact through a function call mechanism, other communication methods are possible including message passing, mutex or semaphore based systems, or by other communication techniques.

Specific components of the system may include additional or different components. A processor may be implemented as a microprocessor, a microcontroller, a DSP, an application specific integrated circuit (ASIC), discrete logic, or a combination of other types of circuits or logic. Similarly, memories may be DRAM, SRAM, Flash or any other type of memory. The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

Furthermore, the system 100 may represent data implicitly such as in a normal form such as third normal form (3NF) or Boyce-Codd Normal Form (BCNF). The system 100 may also store some data in multiple formats in a single data structure or multiple data structures. Additionally, and of the citation systems, rules sets or other data may be compressed, encrypted, or otherwise encoded for faster access time, facilitation of certain operations, ease of implementation, ease of debugging, reduction in storage requirements, or to meet other objectives.

Thus, the citation system provides that capability to use one or more dynamically selected rule sets to determine information required to create a correct citation, to generate citations from one or more dynamically selected rule sets, and to automatically regenerate citations when a new rule set is applied. The citation system may encode, access, and apply many different types of rules, including syntax rules, semantic rules (for example, the case reporter (e.g., U.S.) should be acceptable for the court (e.g., the Supreme Court) to which the document will be submitted), context rules, consistency rules (e.g., use italics or underlining consistently), temporal rules, and other rules.

While various embodiments of the system have been described, it will be apparent to those of ordinary skill in the art that many more embodiments and implementations are possible within the scope of the invention. Accordingly, the invention is not to be restricted except in light of the attached claims and their equivalents.

I claim:

1. A method of processing citations, comprising:

determining available rule sets for multiple citation systems;

receiving an input citation, and storing the input citation in a computer memory;

determining a validating citation rule from among the rule sets that validates a given citation component within the input citation, with respect to a first citation system among the multiple citation systems, to obtain a validated citation component, where the validating citation rule comprises either or both of:

a validating function attribute that specifies a validating function operable to check whether the given citation component validates; and a generating function attribute that specifies a generating function operable to generate, using the given citation component, the validated citation component storing the validated citation component in the computer memory;

determining a selected citation system, different from the first citation system, from among the multiple citation systems;

accessing with the processor coupled to the computer memory, an applicable rule set chosen for the selected citation system from the available rule sets;

applying, with the processor, an applicable citation rule the applicable rule set to the validated citation component to determine an output citation component adhering to the selected citation system.

2. The method of claim 1, further comprising:

determining a different citation system from among the multiple citation systems;

accessing a different rule set chosen for the different citation system from the available rule sets; and automatically applying the different rule set to the output citation component to determine a different citation component adhering to the different citation system.

3. The method of claim 1, further comprising:

binding the selected citation system to an electronic document file comprising the input citation.

4. The method of claim 1, further comprising:

determining an additional citation component, not available in the input citation, for determining the output citation component.

5. The method of claim 3, further comprising the step of retrieving the additional citation component from a database.

6. The method of claim 1, further comprising:

providing an electronic document processor extension program for applying the applicable citation rule to the input citation.

7. The method of claim 1, further comprising:

providing a word processor extension program for applying the applicable rule set to the input citation.

8. The method of claim 1, further comprising:

providing a document browser extension program for applying the applicable rule set to the input citation.

9. The method of claim 1, where the selected citation system comprises a legal citation system, a technical citation system, or any combination thereof.

10. The method of claim 1, further comprising:

inserting the output citation component into an electronic document.

11. A tangible computer readable medium storing logic for execution by a processor in a citation processing system, that, when executed, causes the processor to:

receive an input citation;

determine available rule sets for multiple citation systems;

determine a validating citation rule from among the rule sets that validates a given citation component within the input citation, with respect to a first citation system among the multiple citation systems, to obtain a validated citation component, where the validating citation rule comprises either or both of:

a validating function attribute that specifies a validating function operable to check whether the given citation component validates; and a generating function attribute that specifies a generating function operable to generate, using the given citation component, the validated citation component determine a selected citation system, different from the first citation system, from among the multiple citation systems;

apply an applicable citation rule within an applicable rule set to the validated citation component to determine an output citation component adhering to the selected citation system.

12. The computer readable medium of claim 11, where the logic, when executed, further causes the processor to automatically determine a new citation component based on the output citation component upon operator selection of a new citation system, the new citation component adhering to the new citation system.

13. The computer readable medium according to claim 11, where the logic, when executed, further causes the processor to bind the selected citation system to an electronic document file.

14. The computer readable medium according to claim 11, where the logic, when executed, further causes the processor to determine an additional citation component, for determining the output citation component, not available in the input citation.

15. The computer readable medium according to claim 14, where the logic, when executed, further causes the processor to retrieve the additional citation component from a database.

16. The computer readable medium according to claim 11, where the logic, when executed, further causes the processor to apply a syntax rule, a semantic rule, a temporal rule, or any combination thereof, to determine the output citation component.

17. The computer readable medium according to claim 11, where the logic, when executed, further causes the processor to apply a context rule, a pragmatic rule, a consistency rule, or any combination thereof, to determine the output citation component.

18. The computer readable medium according to claim 11, where the logic, when executed, further causes the processor to insert the output citation component into an electronic document.

19. A citation processing server comprising:

a communication interface operable to receive an input citation from a citation source;

a processor;

a memory comprising logic, for execution by the processor, that, when executed, causes the processor to:

determine available rule sets for multiple citation systems;

determine a validating citation rule from among the rule sets that validates a given citation component within the input citation, with respect to a first citation system among the multiple citation systems, to obtain a validated citation component, where the validating citation rule comprises either or both of:

a validating function attribute that specifies a validating function operable to check whether the given citation component validates; and a generating function attribute that specifies a generating function operable to generate, using the given citation component, the validated citation component determine a selected citation system, different from the first citation system, from among the multiple citation systems;

apply an applicable citation rule the applicable rule set to the validated citation component to determine an output citation component adhering to the selected citation system;

where the communication interface is further operable to transmit the output citation component to the citation source.

20. The citation processing server of claim 19, where the communication interface is further operable to receive an electronic document comprising the input citation; and the logic, when executed, causes the processor to insert the output citation into the electronic document; and where: the communication interface is further operable to transmit the electronic document comprising the output citation component to the citation source.

21. The citation processing server of claim 19, where the multiple citation systems comprise a legal citation system.

22. The citation processing server of claim 19, where the logic, when executed, further causes the processor to determine an additional citation component, for determining the output citation, not available in the input citation.

23. The citation processing server of claim 22, further comprising:

a citation component database; and where the logic, when executed, further causes the processor to retrieve the additional citation component from the citation component database.

24. The method of claim 1, where the validating citation rule comprises a node corresponding to the validated citation component, the node comprising either or both of:

the validating function attribute that specifies the validating function, the validating function operable to check whether the given citation component validates against the node; and the generating function attribute that specifies the generating function operable to generate, using the given citation component, the validated citation component.

25. The method of claim 1, where the validating citation rule comprises:

nodes that represent valid citation components; and connections between the nodes that establish permissible relationships between the valid citation components, the nodes and the connections defining citation validating paths through the nodes.

26. The method of claim 11, where the validating citation rule comprises a node corresponding to the validated citation component, the node comprising either or both of:

the validating function attribute that specifies the validating function, the validating function operable to check whether the given citation component validates against the node; and the generating function attribute that specifies the generating function operable to generate, using the given citation component, the validated citation component.

27. The computer readable medium of claim 11, where the validating citation rule comprises:

nodes that represent valid citation components; and connections between the nodes that establish permissible relationships between the valid citation components, the nodes and the connections defining citation validating paths through the nodes.

28. The method of claim 19, where the validating citation rule comprises a node corresponding to the validated citation component, the node comprising either or both of:

the validating function attribute that specifies the validating function, the validating function operable to check whether the given citation component validates against the node; and the generating function attribute that specifies the generating function operable to generate, using the given citation component, the validated citation component.

29. The citation processing server of claim 19, where the validating citation rule comprises:

nodes that represent valid citation components; and connections between the nodes that establish permissible relationships between the valid citation components, the nodes and the connections defining citation validating paths through the nodes.

* * * * *

UNITED STATES PATENT AND TRADEMARK OFFICE

CERTIFICATE OF CORRECTION

PATENT NO. : 7,844,899 B2
APPLICATION NO. : 11/657281
DATED : November 30, 2010
INVENTOR(S) : Michael L. Boucher It is certified that error appears in the above-identified patent and that said Letters Patent is hereby corrected as shown below:

In the Claims

In column 19, claim 1, line 3, after "citation component" insert --;--.

In column 19, claim 1, line 9, before "processor coupled to" replace "accessing with the" with --accessing, with a--.

In column 19, claim 1, line 11, after "the available rule sets;" insert --and--.

In column 19, claim 1, line 12, after "an applicable citation rule" insert --within--.

In column 20, claim 11, line 6, after "systems;" insert --and--.

In column 20, claim 11, line 8, before "to the validated citation component" insert --for the selected citation system--.

In column 20, claim 19, line 67, after "the validated citation component" insert --;--.

In column 21, claim 19, line 4, after "an applicable citation rule" replace "the applicable rule set to" with --within an applicable rule set for the selected citation system to--.

In column 21, claim 19, lines 6-7, immediately after "selected citation system" replace ";" with --,--.

Signed and Sealed this
Third Day of July, 2012

David J. Kappos

David J. Kappos
*Director of the United States Patent and Trademark Office*